United States Patent [19]
Bednar et al.

[11] Patent Number: 4,611,346
[45] Date of Patent: Sep. 9, 1986

[54] METHOD AND APPARATUS FOR CHARACTER RECOGNITION ACCOMMODATING DIACRITICAL MARKS

[75] Inventors: Gregory M. Bednar, Matthews; George B. Fryer; Manthri S. Narasimha, both of Charlotte, all of N.C.

[73] Assignee: International Business Machines Corporation, Armonk, N.Y.

[21] Appl. No.: 537,279

[22] Filed: Sep. 29, 1983

[51] Int. Cl.⁴ .............................................. G06K 9/36
[52] U.S. Cl. ........................................... 382/9; 382/37
[58] Field of Search .................... 382/9, 16, 19, 23, 37

[56] References Cited
U.S. PATENT DOCUMENTS

| | | | |
|---|---|---|---|
| 3,638,188 | 1/1972 | Pincoffs et al. | 382/23 |
| 3,710,321 | 1/1973 | Rubenstein | 382/37 |
| 4,206,442 | 6/1980 | Miyazaki et al. | 382/9 |
| 4,527,283 | 7/1985 | Ito et al. | 382/9 |

Primary Examiner—Leo H. Boudreau
Attorney, Agent, or Firm—Bell, Seltzer, Park & Gibson

[57] ABSTRACT

A method and apparatus of processing data is disclosed for recognizing unknown characters of a known character set, some of the characters having diacritical marks. The method includes the steps of storing the image data of an unknown character which may contain a diacritical mark. From the stored image data a predetermined localized area of data is extracted that corresponds to the expected location of the diacritical mark. The extracted diacritical mark image data and at least a portion of the stored image data of the unknown character are examined to recognize the character and any diacritical mark associated therewith. Also disclosed are video preprocessing techniques for segmenting the characters using profiles thereof, inclusive-bit-coding to separate characters based upon differences in size, justification of the extracted diacritical mark image data, unique encoding of the recognition results, and postprocessing verification for characters including diacritical marks.

18 Claims, 13 Drawing Figures

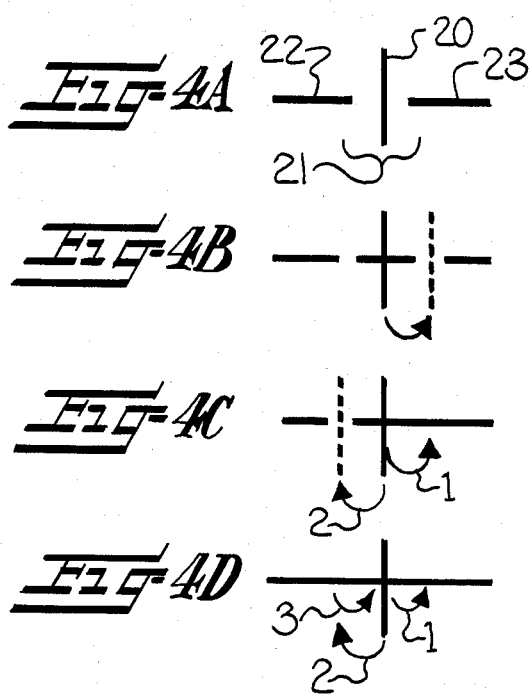
FIG-4A
FIG-4B
FIG-4C
FIG-4D
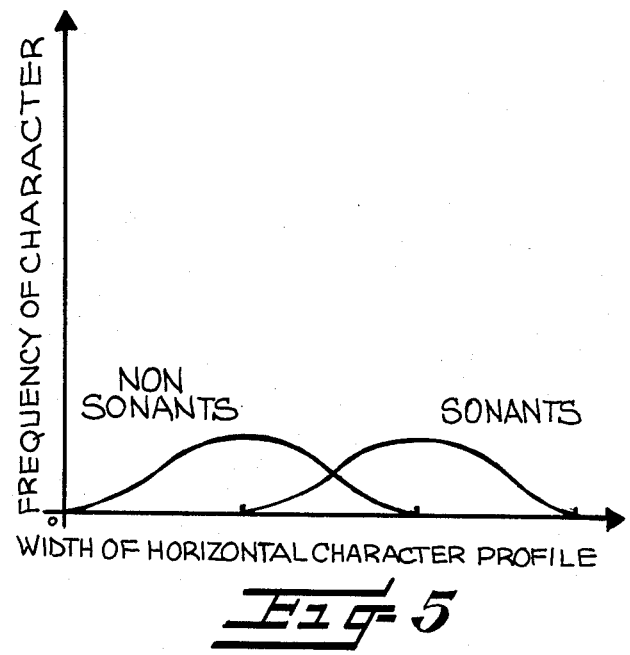
FIG-5
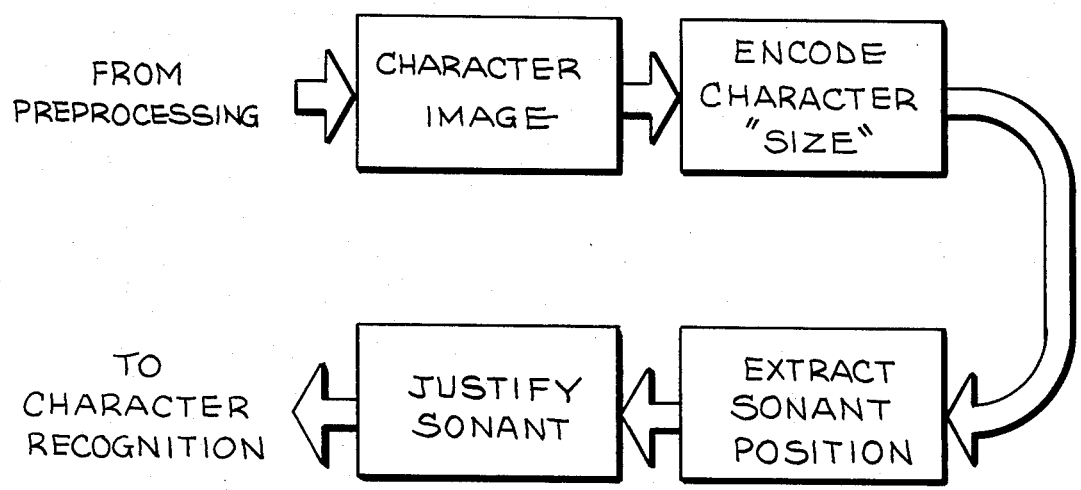
FIG-6

| BIT | WIDTH OF HORIZONTAL PROJECTION | EXCLUSIVE CODING | INCLUSIVE CODING |
|---|---|---|---|
| 1 | 0 < W ≤ 4 | 1000000000000000 | 1000000000000000 |
| 2 | 4 < W ≤ 8 | 0100000000000000 | 1100000000000000 |
| 3 | 8 < W ≤ 12 | 0010000000000000 | 1110000000000000 |
| 4 | 12 < W ≤ 16 | 0001000000000000 | 1111000000000000 |
| 5 | 16 < W ≤ 20 | 0000100000000000 | 1111100000000000 |
| 6 | 20 < W ≤ 24 | 0000010000000000 | 1111110000000000 |
| 7 | 24 < W ≤ 28 | 0000001000000000 | 1111111000000000 |
| 8 | 28 < W ≤ 32 | 0000000100000000 | 1111111100000000 |
| 9 | 32 < W ≤ 36 | 0000000010000000 | 1111111110000000 |
| 10 | 36 < W ≤ 40 | 0000000001000000 | 1111111111000000 |
| 11 | 40 < W ≤ 44 | 0000000000100000 | 1111111111100000 |
| 12 | 44 < W ≤ 48 | 0000000000010000 | 1111111111110000 |
| 13 | 48 < W ≤ 52 | 0000000000001000 | 1111111111111000 |
| 14 | 52 < W ≤ 56 | 0000000000000100 | 1111111111111100 |
| 15 | 56 < W ≤ 60 | 0000000000000010 | 1111111111111110 |
| 16 | 60 < W ≤ 64 | 0000000000000001 | 1111111111111111 |
Fig-7
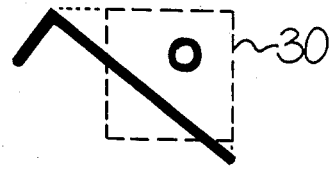
Fig-8  Fig-9
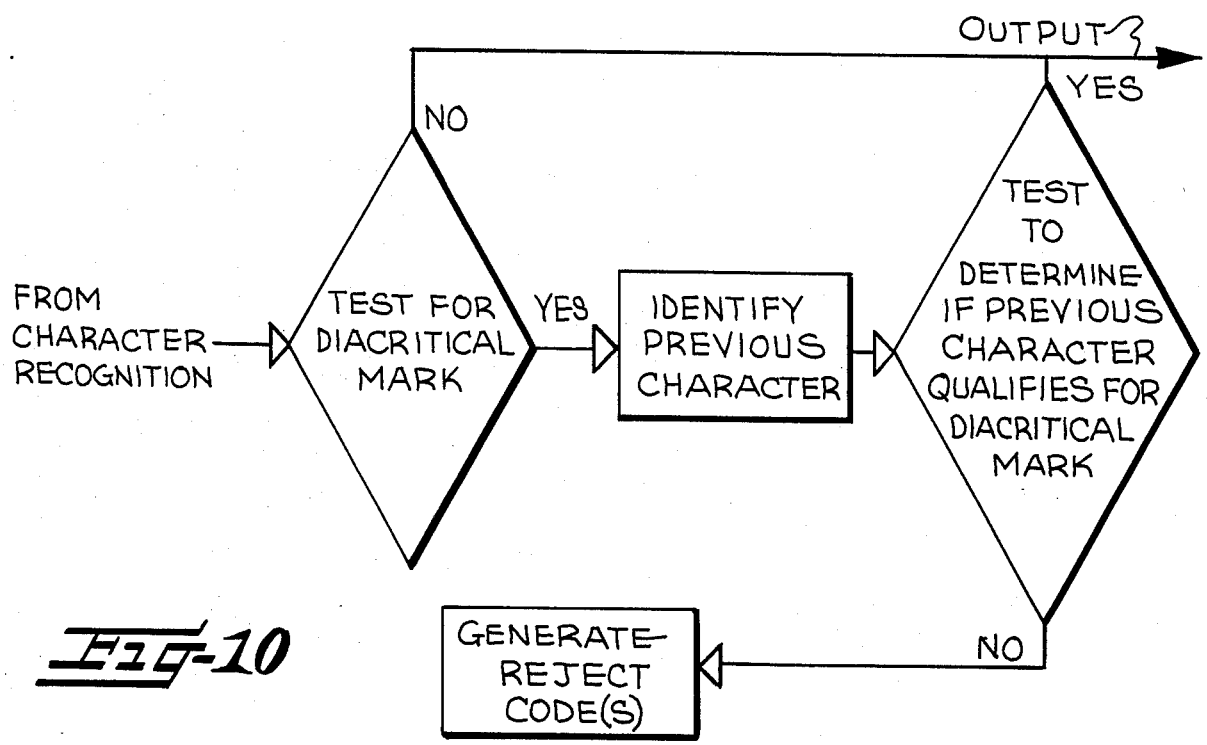
Fig-10

METHOD AND APPARATUS FOR CHARACTER RECOGNITION ACCOMMODATING DIACRITICAL MARKS

FIELD OF THE INVENTION

This invention relates to the field of character recognition through data processing, and more particularly to the recognition of characters or symbols which may have associated therewith diacritical marks, using optical character recognition equipment.

BACKGROUND OF THE INVENTION

Languages by which human beings communicate employ a set of symbols which comprise an alphabet. Certain of these symbols can be modified by designated signs or marks, called diacritical marks, which are positioned as required by the rules of the language. These diacritical marks may, for example, require an altered pronunciation of the symbol or base character with which they are associated.

The Japanese phonetic alphabet Katakana is of this type, and this alphabet will be used herein to describe the present invention, by way of example and not by way of limitation.

Prior art character recognition equipment has recognized the need to provide special means to accommodate characters which may have an associated diacritical mark and recognize the difference between a character with a diacritical mark and one without. U.S. Pat. No. 3,710,321 provides such an arrangement. In the device of this patent, a central, horizontal row area contains the major characters or base symbols of the alphabet. Certain of these major characters may have diacritical marks associated therewith, in areas above or below the major character. When a vertical scan of a major character, and the recognition of this character, indicates that this character is of the class that may contain a diacritical mark, then vertical scanning of the next major character is momentarily interrupted, and the scan is diverted to the diacritical area above or below (as the case may be) the just-recognized character. Thereafter, scanning of the major character continues, and special upper or lower diacritical recognition logic is enabled as such diacritical upper or lower areas are scanned.

Of the two Japanese alphabets, Hiragana and Katakana, the latter is the accepted means of interfacing or representing the Japanese language to data processing equipment by means of character recognition apparatus. Each Katakana sound is a syllable formed by adding each of the vowels A, I, U, E and O to each of the consonants K, S, T, N, H, M, Y, R and W. The combinations YI, YE, WI, WU and WE are excluded. The A, I, U, E, O, and N sounds by themselves are also included. The pronunciation for certain of these basic symbols can be modified by adding diacritical marks, i.e., either two small lines collectively called a nigori or a small circle called a maru, immediately adjacent the upper right of the basic symbol. In addition, a long vowel symbol written as a dash follows certain basic symbols to alter their pronunciation. The two diacritical marks plus the long vowel symbol are combined with certain of the basic letters to expand the overall Katakana alphabet to include 72 characters. Those Katakana characters with a diacritical mark are often called sonants, and those without a diacritical mark are called non-sonants.

This large symbol set makes manual keying a difficult, slow and costly means of data processing entry. Several prior art optical character recognition (OCR) machines have been developed that automatically read handwritten Katakana symbols. However, due to the complexity of the sonant characters, and the close location of the diacritical mark to the base symbol, these machines require that the diacritical mark be written as a separate mark, in its own character space, clearly separated from the basic character which it modifies. As a result, only the 46 basic non-sonant character shapes plus the two separated and isolated diacritical marks are machine readable, and the 25 sonant characters written in their natural (upper-right and adjacent) form cannot be read. Thus, a special set of writing rules that differs from the usual rules of the Katakana language must be utilized for these OCR machines.

SUMMARY OF THE INVENTION

This invention provides an apparatus and a method which enables the identification of unknown characters and any diacritical marks or symbols associated therewith. It may be used with Katakana characters when the diacritical marks are written in either their natural adjacent form, or when separately written under the constraints required by the above-mentioned OCR machines. All seventy-two Katakana alphabet shapes plus the two diacritical marks as separate stand-alone symbols can be recognized utilizing the present invention, without special rules, thereby allowing optical character recognition to be extended to include general public handwriting and writing done according to the rules of the Katakana language. In addition, this invention may include new video pre-processing techniques, inclusive-bit-coding, specialized diacritical mark measurements, unique encoding of recognition results, and post processing verification for characters including diacritical marks.

The method of processing data for recognizing unknown characters, where some of the characters may include an associated diacritical mark, includes the steps of storing the image data of an unknown character which may include a diacritical mark. From the stored image data a predetermined localized area of data is extracted that corresponds to the expected location of a diacritical mark. The extracted diacritical mark image data and at least a portion of the stored image data of the unknown character are examined to recognize the character. For example, in the Katakana alphabet the diacritical marks are located to the upper right portion of the character. The section of the image data of the unknown character that corresponds to the upper right portion of the character is extracted and examined for recognition. More specifically, the extracted image data is upper-right justified within the data section and remains unnormalized during the examination and recognition Docket process. The image data of the unknown character is normalized and also examined for recognition of the Katakana character.

With respect to video preprocessing of the image data, characters modified by diacritical marks are normally wider than the same characters without a diacritical mark and these differences are used to initially separate sonant characters from non-sonant characters. A row of unknown characters is scanned in their entirety parallel to the direction in which the lines are read, (i.e.

horizontally read lines are horizontally scanned) and a horizontal profile is generated for the row of unknown characters. Logical tests are performed on the resulting profile data to separate the profile into individual segments representing an unknown character including any diacritical mark. When an expected segmentation point for the horizontal profile coincides with a natural segmentation point, that segmentation is established. When the horizontal profile is continuous (i.e. when adjacent characters overlap) at an expected segmentation boundary, the location of the expected segmentation point is adjusted as follows. If the continuity of the profile extends less than a predetermined distance into the next-right-character position, the segmentation point for the current character position is expanded to include the extended portion, which may be a diacritical mark. If the extension exceeds a predetermined distance, the segmentation point can be contracted to account for a possible stroke extension of the next character (i.e. such as a diacritical mark or an adjacent character) written immediately to the right of the current character. Thus, for the Katakana alphabet, the present invention permits recognition of characters that have been written under the usual handwritten rules or under the constraints of prior art OCR machines.

Height and width parameters are used to initially separate a modified character from an unmodified character by analyzing their relative size from measurements of their horizontal and/or vertical profiles. For the Katakana alphabet, sonant characters are initially separated from non-sonant characters based upon differences in the horizontal width of the entire character, including any diacritical mark. In the past, the coding of the height and width of a character has been through exclusive-bit-coding, which is inferior to the inclusive-bit-coding used in the present invention. Exclusive-bit-coding sets a single unique bit for each specific value or range of height and width. With a single bit test, all characters with a specific height or width can be separated from all other characters which are either greater than or less than the specified value. To assist in identifying Katakana sonant characters it is desirable to separate all characters which are less than a specific height or width (i.e. non-sonants) from all other characters which are greater than that value (i.e. sonants). With exclusive-bit-coding this requires the testing of multiple bits. Using inclusive-bit-coding, a continuous string of bits is set to indicate that the character is at least as wide as each of the bits that is set. By testing a single bit it is possible to separate all characters which are greater than a specific height or width from all those which are less than or equal to this value. Thus the usually wider and taller sonant characters having diacritical marks may be separated from the nonsonant characters that do not include a diacritical mark.

With respect to the encoding of the recognition results for Katakana characters, the Japanese Industries Standard for assigning recognition results provides a unique one byte code point for each of the forty-six basic Katakana symbols, and for the two diacritical marks nigori and maru. These diacritical code points indicate that the sonant is present as a separate symbol in its own character space, but they do not distinguish between the sonant mark written as a separate symbol from the more natural form where the sonant is combined with the basic character. By assigning two additional code points one can indicate that the diacritical mark is included with the basic character.

With respect to post-processing verification for the sonant characters, a procedure is used when a diacritical mark is recognized. For the Katakana alphabet, the recognition result of the previous character position is checked to verify that it is one of the twenty possible characters which can be modified by a nigori or that it is one of the five possible characters which can be modified by a maru. If the verification fails, the sonant and/or previous character recognitions can be rejected as invalid characters.

BRIEF DESCRIPTION OF THE DRAWINGS

FIGS. 4A–4D illustrate the sequence of steps set forth in the flowchart of FIG. 3.

FIG. 5 is a graph of the frequency of character occurrence versus the width of the horizontal profile for Katakana non-sonant characters and Katakana sonant characters.

FIG. 6 is a flowchart illustrating the steps for sonant identification.

FIG. 7 is a chart comparing exclusive-bit-coding and inclusive-bit-coding.

FIG. 8 illustrates a Katakana character including a diacritical mark, with the diacritical mark enclosed in a predetermined localized area, as indicated by dashed lines.

FIG. 9 illustrates the data in the predetermined localized area of FIG. 8 justified to the upper right.

FIG. 10 is a flowchart illustrating a post-processing verification technique to validate the proper association of a diacritical mark with a character.

DESCRIPTION OF AN ILLUSTRATIVE EMBODIMENT

It is to be understood that although Japanese Katakana characters are illustrated, the present invention may be utilized with any alphabet having characters that may or may not include diacritical marks. Similarly, the diacritical marks may be located in any predetermined areas with respect to the characters, according to the rules of the language.

Figure 1:
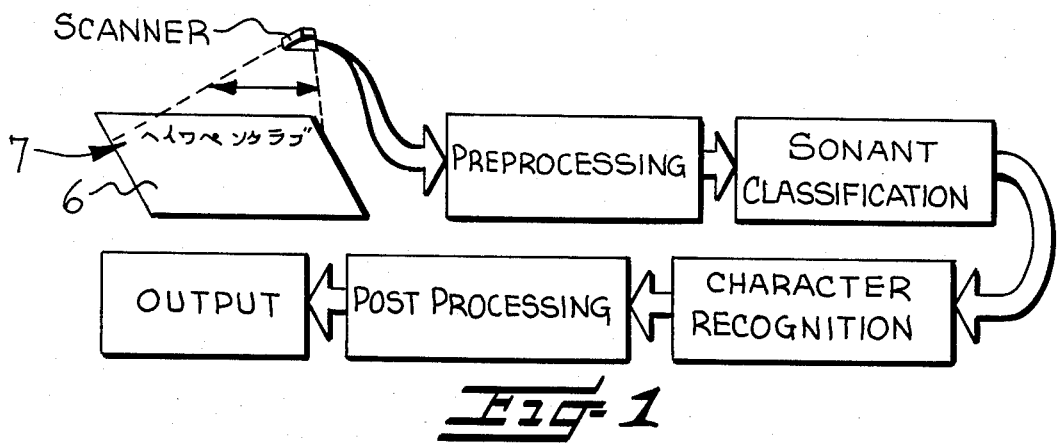
FIG. 1 is a schematic diagram reflecting the generation of data representing the unknown characters by an optical scanner and the method of the present invention for processing the data to obtain an output recognizing the unknown characters.

Referring to FIG. 1, a schematic diagram of the method of the present invention reflects the generation by an optical scanner of data representing the unknown characters. The scanner is of a known construction and operation. It typically scans a document 6 exhibiting unknown characters, including any diacritical marks, in a direction parallel to the direction of reading. FIG. 1 illustrates a horizontal scan of a line of characters 7. The scanner examines the entire length of the document by moving either the document or scanner mechanism, and the entire width of the document by selecting a field of view of appropriate width. The generated scan data is preprocessed, as by generating profiles of the character lines and dividing the profiles into segments of individual characters, to thereby provide character image data. To classify the sonant characters, the character image data has extracted therefrom a predetermined localized area that corresponds to the expected location of a diacritical mark, and then the extracted image data and character image data are examined to recognize the respective diacritical mark and character. The preliminarily recognized character may then be subjected to a post processing verification procedure to insure that any diacritical mark is associated with a character that may properly include a diacritical mark under the applicable language rules.

Figure 2:
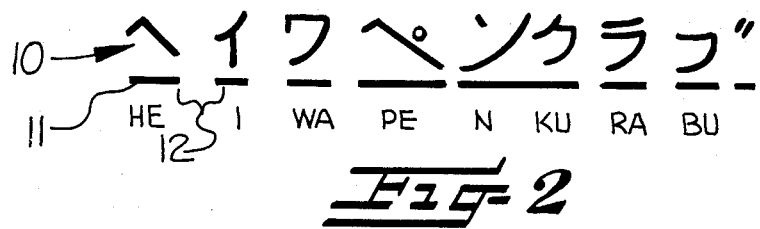
FIG. 2 illustrates a line of several Katakana characters and the horizontal profile for the line of characters.

Referring to FIG. 2, the letters HE, I, WA, N, KU, and RA do not include diacritical marks and are referred to as non-sonants. The letter BU includes the diacritical mark nigori (double line) in the upper right corner, and the letter PE includes the diacritical mark maru (circle), also in the upper right corner. Both of these characters are referred to as sonants. The horizontal scan lines of data from the scanner are logically combined with an OR fuction to generate a horizontal profile for the line of scanned characters. The horizontal profile is representative of the width of the characters in the line and the spacing between these characters.

In operation, the optical scanner generates information representative of the character images on a document, and this information is usually a series of scan lines of binary data representing the dark and light portions of the document and, thus, the characters thereon. The scanner makes successive horizontal scans and for each scan it generates logical zeros (0's) to represent a blank or background space, and logical ones (1's) to represent the presence of a character image along the scan line. One method of generating the horizontal profile is to sequentially provide a predetermined number of horizontal scan lines for a certain row of characters to a register having storage positions that correspond to the picture element (PEL) locations of a scanned document. Beginning with a clear register (i.e. all logical zeros), the horizontal scan lines of data are effectively logically combined with an OR function by successively providing them to the register. For each logical 1 in the scan lines of data, the corresponding register bit is set to a logical 1, and remains a logical 1 until the register is cleared after the entire line of character images has been scanned. For those PEL locations where there is only background space, the register will remain a logical zero. Having provided all of the scan lines of data to the register, it will reflect which horizontal positions have character data present, and this data is reflected in the horizontal profile.

The horizontal profile, such as the one illustrated at reference numeral 10 for FIG. 2, appears as a series of black segments (logical 1's) separated by gaps of white (logical 0's). The black segments 11 correspond to the width of the image data representing the characters and any associated diacritical marks. The white gaps 12 correspond to the separation between adjacent characters.

Figure 3:
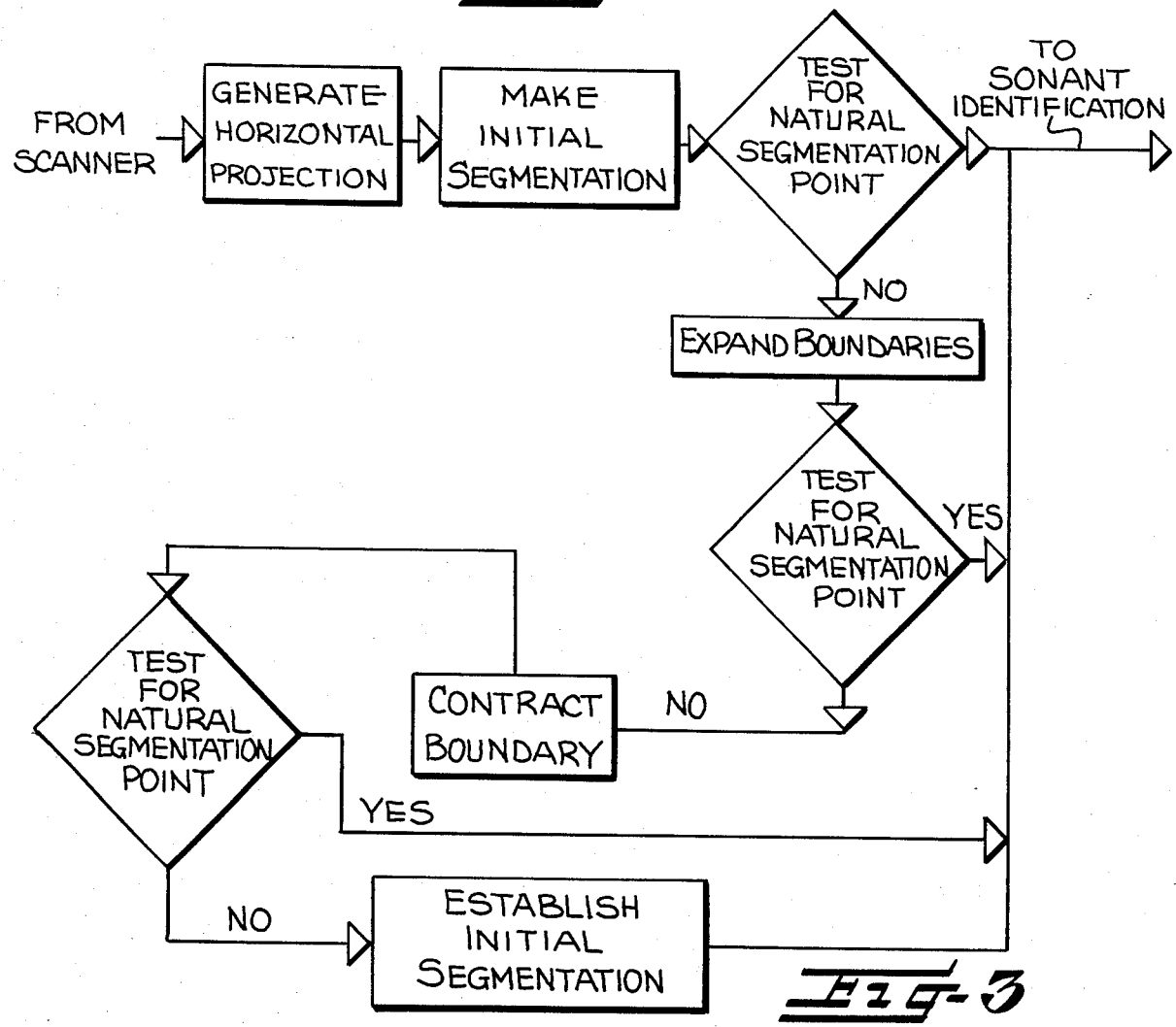
FIG. 3 is a flowchart illustrating the pre-processing steps for segmenting a horizontal profile.

The horizontal profile is next separated into segments that represent individual unknown characters, including any diacritical marks. Referring to FIGS. 3 and 4, an initial segmentation is made between characters based upon a given pitch (spacing between characters), or the calculation of the pitch, which may be determined using known techniques. Logical tests are made to determine if the initial segmentation coincides with a natural segmentation point or gap between adjacent horizontal profiles. As illustrated in FIG. 4A, if the initial segmentation 20 coincides with a natural separation 21 between adjacent horizontal profiles 22, 23, the initial segmentation is established as a separation between characters.

If the initial segmentation does not coincide with a natural segmentation between adjacent horizontal profile segments, namely where the characters overlap or where a diacritical mark extends into the next-right-character space, the profile is progressively tested up to a predetermined amount (for example 1.5 mm) into the adjacent character position to the right, as shown in FIG. 4B. If an expanded segmentation coincides with a natural segmentation, it is established as a separation between characters, as illustrated by the dashed line in FIG. 4B. Referring to FIG. 2, the sonant characters BU and PE are examples of characters that may have a wider than expected horizontal profile segments, and they would employ the above segmentation expansion technique.

As shown in FIG. 4C, if an expanded segmentation does not coincide with a natural segmentation, as illustrated by the arrow labelled 1, the initial segmentation is progressively contracted up to a predetermined amount (for example 1.5 mm) to the left, as illustrated by the arrow labelled 2. If a contracted segmentation coincides with a natural segmentation, it is established as a separation between characters, as illustrated by the dashed line in FIG. 4C.

As shown in FIG. 4D, if the initial segmentation could not be expanded (arrow 1) or contracted (arrow 2) to coincide with a natural separation, the initial segmentation is established as a separation between characters., as illustrated by the arrow labelled 3. This accommodates the instance of adjacent characters overlapping, as shown in FIG. 2 by the letters N and KU.

This segmentation technique enables diacritical marks to be included with their proper base character, according to the usual language rules for writing Katakana sonants. One may alternatively, or additionally, use a vertical character profile, which is generated by suitable manipulation of the data from the scanner, or by physically reorienting the scanner with respect to the scanned document.

As noted earlier, Katakana characters with diacritical marks are generally taller and wider than those without. As illustrated in FIG. 5, a plot of width of the horizontal character profile, which is directly related to actual character width, versus the frequency of character occurrence reflects that sonants are generally wider than non-sonants. Thus, width parameters can be used to reliably separate modified characters from unmodified characters.

Having separated the character image data by segmenting the horizontal line profiles, sonant identification begins, as illustrated in FIG. 6, by encoding the character size and separating sonant characters from non-sonant characters based upon differences in the width of the horizontal character profiles, as illustrated in FIG. 5. Next, the localized area corresponding to the expected location of the diacritical mark is extracted from the character image data and justified. The extracted image data and the stored image data are then passed to the character recognition logic for identification of the unknown character.

To encode character size, the present invention uses inclusive-bit-coding to logically store the height and width of the characters, including any diacritical marks. Referring to FIG. 7, a 16-bit word is used to represent a character space that is 64 PELS wide, each bit corresponding to a width range of 4 PELS. Prior art techniques use exclusive-bit-encoding to set a single digit indicative of the width of each character. With a single bit test, all characters having a specific width can be separated from all others which are either greater or less than a specific value. However, to identify all characters greater than a specific value, a number of tests are required.

Using inclusive-bit-encoding, all bits less than or equal to a specific width are set to the same logic state (i.e., a logical 1). By way of example, if the width of a character is 38 PELS, the inclusive-bit-encoded word associated with the character is "1111 1111 1100 0000". By comparison, the exclusive-bit-encoded word is "0000 0000 0100 0000". In the present invention, it is necessary to test only a single bit of the inclusive-bit-encoded words to separate wider (or taller) characters from smaller characters. Again by way of example, by testing bit 10 of the inclusive-bit-encoded register of FIG. 7, all characters less than or equal to 40 PELS wide can be separated from all characters which are greater than 40 PELS wide. To accomplish the same result by testing the exclusive-bit-encoded register would require a minimum of seven bit tests for each word.

An additional advantage of the inclusive-bit-coding is for automatic design of recognition logics. Automatic design programs usually use a statistical decision algorithm which selects one bit to separate two distinct classes of characters based on some minimum error criteria. This coding scheme provides optimum information for such an algorithm.

Referring to FIGS. 8 and 9, the image data contained in a predetermined localized area that corresponds to the expected location of a diacritical mark is extracted and examined to recognize any diacritical mark present.

For Katakana characters, the diacritical mark is expected to be located in the upper right portion of the character image, and a sonant cut-out 30 or window, indentified by the dashed lines in FIG. 8, is defined and the data within this localized area is placed into a sonant cut-out buffer. In a preferred embodiment this cut-out is generated from the rightmost 13 PELS of the top 16 scan lines of the character image data (i.e. 1.6 mm by 2.1 mm). This size is believed to be optimum because it retains sufficient information for sonant identification, it allows efficient data handling for microprocessor implementation, and is compatible with the recognition procedures for the base character. This location for the window was chosen because it provides the least interference with stroke segments of non-sonant characters or the base character of a sonant character. A fixed window location further provides a simple, efficient and reliable cutting process. The window size or location may be changed as necessary or desireable for other alphabets to accommodate different diacritical marks, but for the Katakana alphabet, it is preferred to have the upper boundary even with the top of the base character and the right boundary even with the right-most portion of the base character.

In the preferred embodiment the image data within the window is registered to the upper right when it is placed into the sonant cut-out buffer, and it is stored in its unnormalized form. This locates the diacritical mark in the upper right corner of the window, which facilitates recognition of the presence of a diacritical mark, increases the reliability of the recognition, and reduces the storage required for the recognition logic. Image data within the window that corresponds to the base character is superfluous.

The image data in the sonant cut-out buffer may also be used to determine the presence or absence of certain diacritical mark features that may be used in the recognition process. These features are implemented in a tree-type logical testing structure to, for example, separate sonant characters from non-sonant characters and to separate the two mark nigori from the circle maru.

Typical character recognition techniques include normalizing or reducing the unknown character image for comparison to known character images of a standardized size. Since diacritical marks are usually smaller than the base character, normalization may result in a loss of small details necessary to recognize the sonant, or a loss of resolution. To retain this information, the original unnormalized image data from the expected location area for the diacritical mark is extracted from the image data for the character and examined in its unnormalized condition. However, due to the larger size of the base character, its image data is often normalized. Final character recognition is then performed using the normalized data image of the unknown character, the unnormalized data image of the diacritical mark, and any diacritical mark features.

Following character recognition it may be desirable to verify that a separately identified diacritical mark should be associated with the preceding character. Referring to FIG. 10, if a diacritical mark is present, the recognition result for the previous character is examined to test if the previous character is one of the twenty possible characters that may include a nigori or one of the five possible characters that may include a maru. If the previous recognition is not a valid sonant base character, one or more reject codes will be generated.

The aforesaid prior art OCR machines operate under the Japanese Industry Standard which assigns a unique hexadecimal byte to each of the 46 kana symbols, and assigns the hexadecimal bytes "BE" to the nigori sonant and "BF" to the maru sonant. These bytes identify the sonant, and indicate that the sonant is written as a symbol separate and apart from a base character in its own character space. The present invention assigns two new code points to identify adjacent, hand written sonant symbols, yet includes the Japanese Industry Standard so that the output is compatible with existing OCR equipment. More specifically, "7F" is assigned to adjacent nigori, and "41" is assigned to adjacent maru.

In the drawings and specification there has been set forth an exemplary embodiment of the invention. It should be understood that while specific terms are used, they are employed in a generic and descriptive sense only and are not for purposes of limitation.

What is claimed is:

1. A method of processing data for recognizing unknown characters of a known character set, some of the characters having diacritical marks associated therewith, said method comprising the steps of:

storing the image data representing an entire unknown character, including any overlapping or non-overlapping diacritical marks associated therewith;

segmenting the stored image data to represent individual unknown characters including any diacritical mark associated therewith;

extracting from the stored image data that portion of the image data representing a predetermined localized area of the unknown character corresponding to the expected location of a diacritical mark;

classifying the segmented image data to provisionally distinguish larger characters which may include a diacritical mark from smaller characters which may not include a diacritical mark;

examining the extracted diacritical mark image data and at least a portion of the non-extracted stored image data of the unknown character with the provisional distinction between the larger and smaller characters to recognize the unknown character and any diacritical mark associated therewith.

2. The method of claim 1 wherein said step of extracting from the stored image data the image data contained in a predetermined localized area includes justifying the extracted data and separately storing the extracted and justified data.

3. The method of cliam 2 wherein the step of justifying the extracted diacritical mark image data comprises justifying said data in a direction away from the unknown character.

4. The method of claim 1 wherein the step of segmenting the stored image data includes generating from the stored image data a profile representing the unknown characters and any diacritical marks associated therewith, and separating the profile into segments, each segment representing an unknown character including any diacritical mark associated therewith.

5. The method of claim 4 wherein the step of separating the profile into segments representing the unknown characters including any diacritical marks associated therewith includes:

(a) testing the profile for natural segmentation points at predetermined initial intervals and establishing as separations the natural segmentation points that coincide with the predetermined intervals;

(b) expanding controlled amounts those predetermined initial intervals not coinciding with natural segmentation points, testing the profile for natural segmentation points within the expanded intervals, and establishing as separations the natural segmentation points that coincide with the expanded intervals;

(c) contracting controlled amounts those predetermined initial intervals and expanded intervals not coinciding with natural segmentation points, testing the profile for natural segmentation points within the contracted intervals, and establishing as separations the natural segmentation points that coincide with the contracted intervals; and (d) fixing as a separation for profiles not previously divided at a natural segmentation point the predetermined initial interval, whereby the individual portions of the profile define the size of the separated individual segments of the unknown characters.

6. The method of claim 4 wherein the step of generating a profile comprises generating a profile parallel to the reading line, and the step of separating the profile comprises separating the profile into segments with each segment representing the relative width of an unknown character.

7. The method of claim 6 wherein the step of generating a profile parallel to the reading line comprises horizontally scanning horizontally read lines of characters to generate lines of data and logically combining the lines of data with an OR function so that the logically combined data corresponds to character widths and horizontal separations between characters.

8. The method of claim 1 wherein said step of classifying the segmented image data comprises generating an inclusive-bit-encoded word representative of the size of the character, and testing a given bit in said word to distinguish larger characters from smaller characters.

9. The method of claim 1 wherein the step of examining the extracted diacritical mark image data comprises testing the unnormalized diacritical mark image data to recognize the diacritical mark.

10. The method of claim 1 wherein the step of examining at least a portion of the non-extracted stored image data of the unknown character comprises testing the normalized image data to recognize the base character.

11. The method of claim 1 further including the final step of verifying that any recognized diacritical mark is associated with a character that may properly include a diacritical mark.

12. The method of claim 1 wherein the step of examining the extracted diacritical mark image data comprises testing the unnormalized diacritical mark image data to recognize the diacritical mark and the step of examining at least a portion of the non-extracted stored image data of the unknown character comprises testing the normalized image data to recognize the base character.

13. A method of processing data for recognizing unknown characters of a known character set, the unknown characters being represented by scan data representing an entire unknown character including any diacritical marks associated therewith, said method comprising the steps of;

storing the image data representing an entire unknown character, including any overlapping or non-overlapping diacritical marks associated therewith;

generating from the stored image data profiles parallel to the reading line representing the unknown characters and any diacritical marks associated therewith, and separating the profiles into segments, each segment representing the relative width of an unknown character including any diacritical mark associated therewith;

extracting from the stored unknown character image data that portion of the image data contained in a predetermined localized area of the unknown character corresponding to the expected location of a diacritical mark;

classifying the segmented profiles and associated character data by generating an inclusive-bit-encoded word representative of the size of the character and testing a given bit in said word to provisionally distinguish larger characters which may include a diacritical mark from smaller characters which may not include a diacritical mark;

justifying the extracted diacritical mark image data;

examining the justified diacritical mark image data and at least a portion of the non-extracted stored image data of the unknown character with the provisional distinction between the larger and smaller characters to recognize the unknown character and any diacritical mark associated therewith.

14. The method of claim 13 wherein the step of separating the profile into segments representing the unknown characters including any diacritical marks associated therewith includes:
  (a) testing the profile for natural segmentation points at predetermined initial intervals and establishing as separations the natural segmentation points that coincide with the predetermined intervals;
  (b) expanding controlled amounts those predetermined initial intervals not coinciding with natural segmentation points, testing the profile for natural segmentation points within the expanded intervals, and establishing as separations the natural segmentation points that coincide with the expanded intervals;
  (c) contracting controlled amounts those predetermined initial intervals and expanded intervals not coinciding with natural segmentation points, testing the profile for natural segmentation points within the contracted intervals, and establishing as separations the natural segmentation points that coincide with the contracted intervals; and
  (d) fixing as a separation for profiles not previously divided at a natural segmentation point the predetermined initial interval, whereby the individual portions of the profile define the size of the separated individual segments of the unknown characters.

15. The method of claim 13 wherein the step of examining the extracted diacritical mark image data comprises testing the unnormalized diacritical mark image data to recognize the diacritical mark.

16. The method of claim 13 wherein the step of examining at least a portion of the non-extracted stored image data of the unknown character comprises testing the normalized image data to recognize the base character.

17. The method of claim 13 further including the final step of verifying that any recognized diacritical mark is associated with a character that may properly include a diacritical mark.

18. Apparatus for recognizing unknown characters of a known character set, some of the characters having diacritical marks associated therewith, said apparatus comprising:
  means for storing the image data representing an entire unknown character including any overlapping or non-overlapping diacritical mark which may be associated therewith;
  means associated with said means for storing for segmenting the stored image data to represent individual unknown characters including any diacritical mark associated therewith;
  means associated with said means for storing the image of an entire unknown character for extracting from the stored image data that portion of the image data representing a predetermined localized area of the unknown character corresponding to the expected location of a diacritical mark;
  means associated with said means for segmenting for classifying the segmented image data to provisionally distinguish larger characters which may include a diacritical mark from smaller characters which may not include a diacritical mark;
  means associated with said means for extracting for examining the extracted diacritical mark image data and at least a portion of the non-extracted stored image data of the unknown character with the provisional distinction between the larger and smaller characters to recognize the unknown character and any diacritical mark associated therewith.

* * * * *

UNITED STATES PATENT AND TRADEMARK OFFICE
CERTIFICATE OF CORRECTION

PATENT NO. : 4,611,346

DATED : September 9, 1986

INVENTOR(S) : Gregory M. Bednar, George B. Fryer, Manthri S. Narasimha

It is certified that error appears in the above-identified patent and that said Letters Patent is hereby corrected as shown below:

Col. 2, line 59: delete the word "Docket"

Col. 6, line 31: after "ters." delete the -- . --

Col. 9, line 19: delete "cliam" and replace with -- claim --

Signed and Sealed this

Sixteenth Day of December, 1986

Attest:

DONALD J. QUIGG

Attesting Officer     Commissioner of Patents and Trademarks